June 18, 1963  N. E. ELSAS  3,094,055
CAMERA

Filed Dec. 16, 1958  3 Sheets-Sheet 1

INVENTOR:
NORMAN E. ELSAS
BY
ATTORNEY

June 18, 1963     N. E. ELSAS     3,094,055
CAMERA
Filed Dec. 16, 1958     3 Sheets-Sheet 2
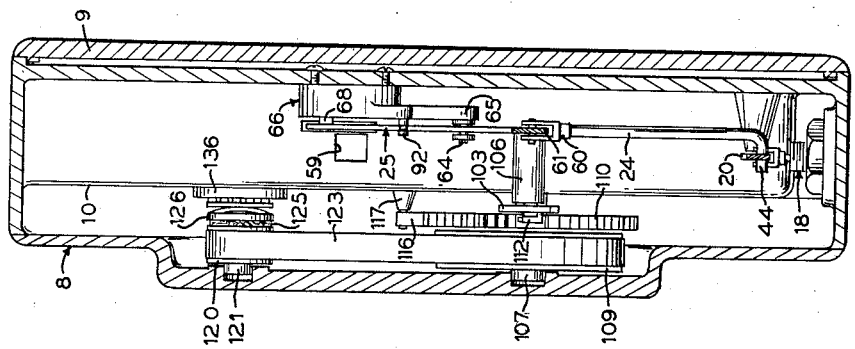
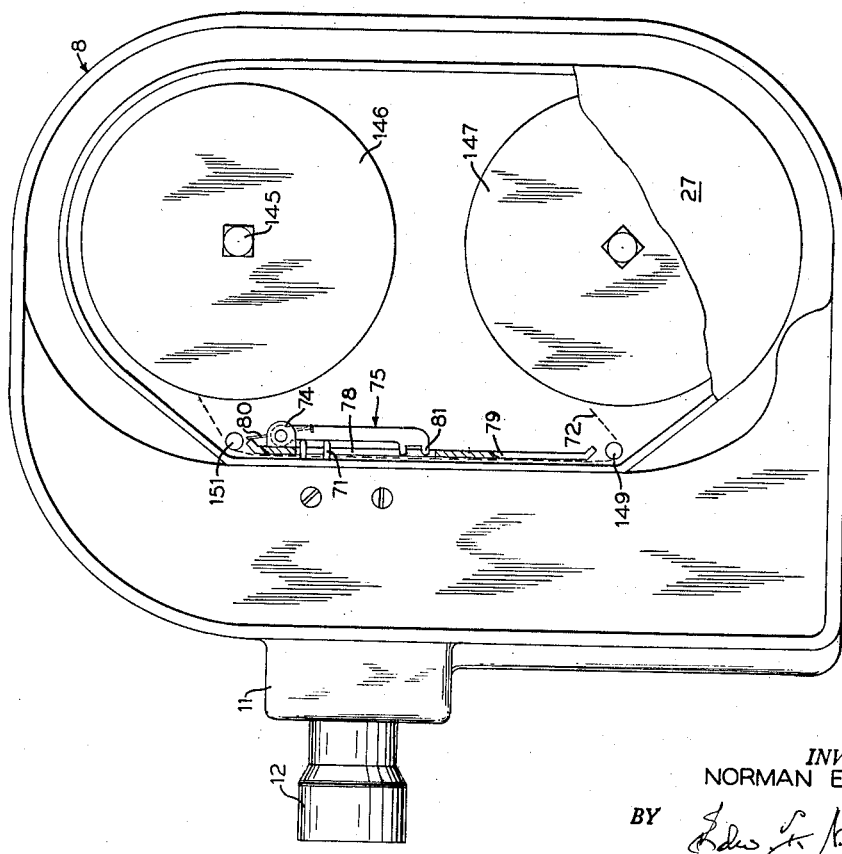
*INVENTOR:*
NORMAN E. ELSAS
BY
ATTORNEY

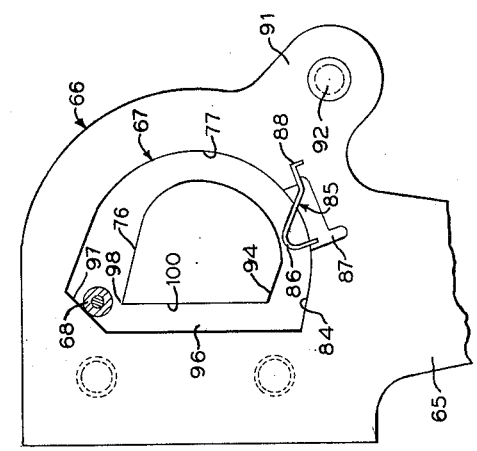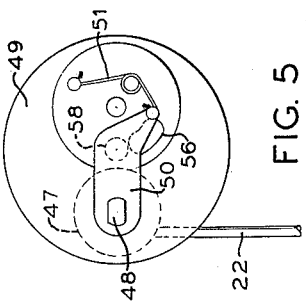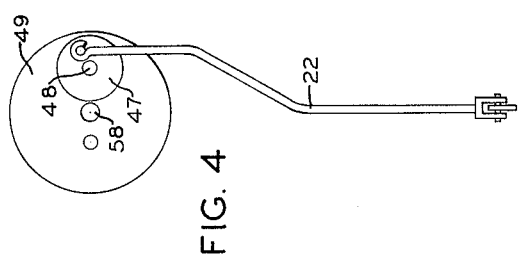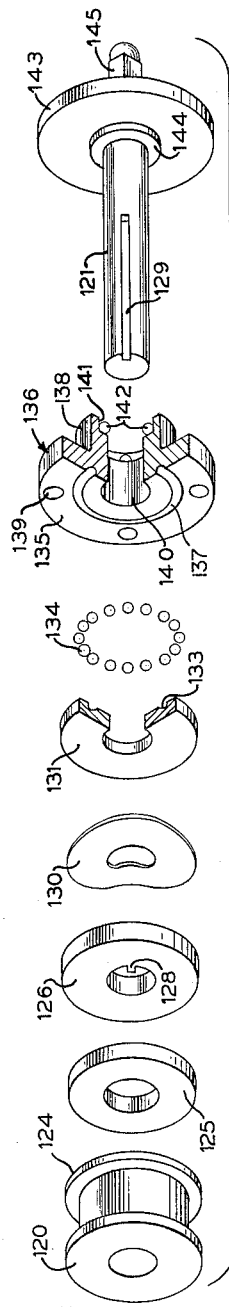

United States Patent Office 3,094,055
Patented June 18, 1963

3,094,055
CAMERA
Norman E. Elsas, 3025 E. Pine Valley Road NW.,
Atlanta, Ga.
Filed Dec. 16, 1958, Ser. No. 780,793
6 Claims. (Cl. 95—31)

This invention relates to a camera, and more particularly relates to a camera for making single frame or "still" photographs on cinematographic film.

It has been the practice for many years to include in "movie" cameras an arrangement for taking single frame photographs so as to permit novel effects to be obtained. Such conventional cameras are usually very complex, heavy and expensive to manufacture, requiring a constant speed motor, either of the spring-driven or electric type, for proper film advancement and shutter operations. The inclusion of such a motor, however, becomes a distinct disadvantage when a camera is used for microfilming, recording meter readings for subsequent tabulations, or for similar applications using single frame techniques, because the motor must either have a supply of electricity or must be manually wound. In either case, the camera requires constant attention by the operator to avoid loss of valuable information which may be obtainable only at the instant the photograph is taken.

While this invention is intended principally for use in recording meter readings, it is equally well suited for photographing important documents on the same type of film. For example, the present invention permits microfilming a great number of documents at a setting, even in field operations where often there is no source of power readily available.

One of the objects of this invention, therefore, is to provide a new and improved camera mechanism which, with one short stroke of the operator's finger, actuates the shutter, advances the film and is ready for the next cycle upon release of the trigger.

Another object of this invention is to provide a new and improved camera for making single frame exposures on cinematographic film that utilizes light weight and trouble free film advancing and shutter actuating mechanisms which need no mechanical or electrical prime mover to effect operation.

Another object of this invention is to provide a new and improved camera for making single frame exposures on cinematographic film that incorporates an unusual film positioning mechanism that effects positive locking of the film while in viewing position as well as during advancing.

A further object of this invention is to provide a new and improved camera having film advancing and shutter operating mechanisms which can be operated entirely by one stroke of the operator's finger.

Still another object of this invention is to provide a new and improved camera for making single frame exposures on cinematographic film which is simple in construction and operation and well adapted to meet the demands of economic manufacture.

Other features, objects and advantages of the present invention will be apparent from consideration of the following specification taken in conjunction with the accompanying drawings wherein like designators refer to the same or similar parts throughout and in which:

FIG. 2 is a side elevation of the camera casing with the cover removed so as to shown the film spools as mounted in the magazine.

FIG. 3 is a vertical section taken along line 3—3 of FIG. 1.

FIG. 4 is a detail of the shutter assembly showing the connection of the control rod thereto.

FIG. 5 is an enlarged detail of the shutter assembly showing the shutter actuating members.

FIG. 6 is an enlarged detail of the D-shaped cam track for guiding the actuator in the film advancing mechanism.

FIG. 7 is an exploded perspective view of the film take-up assembly.

Figure 1:
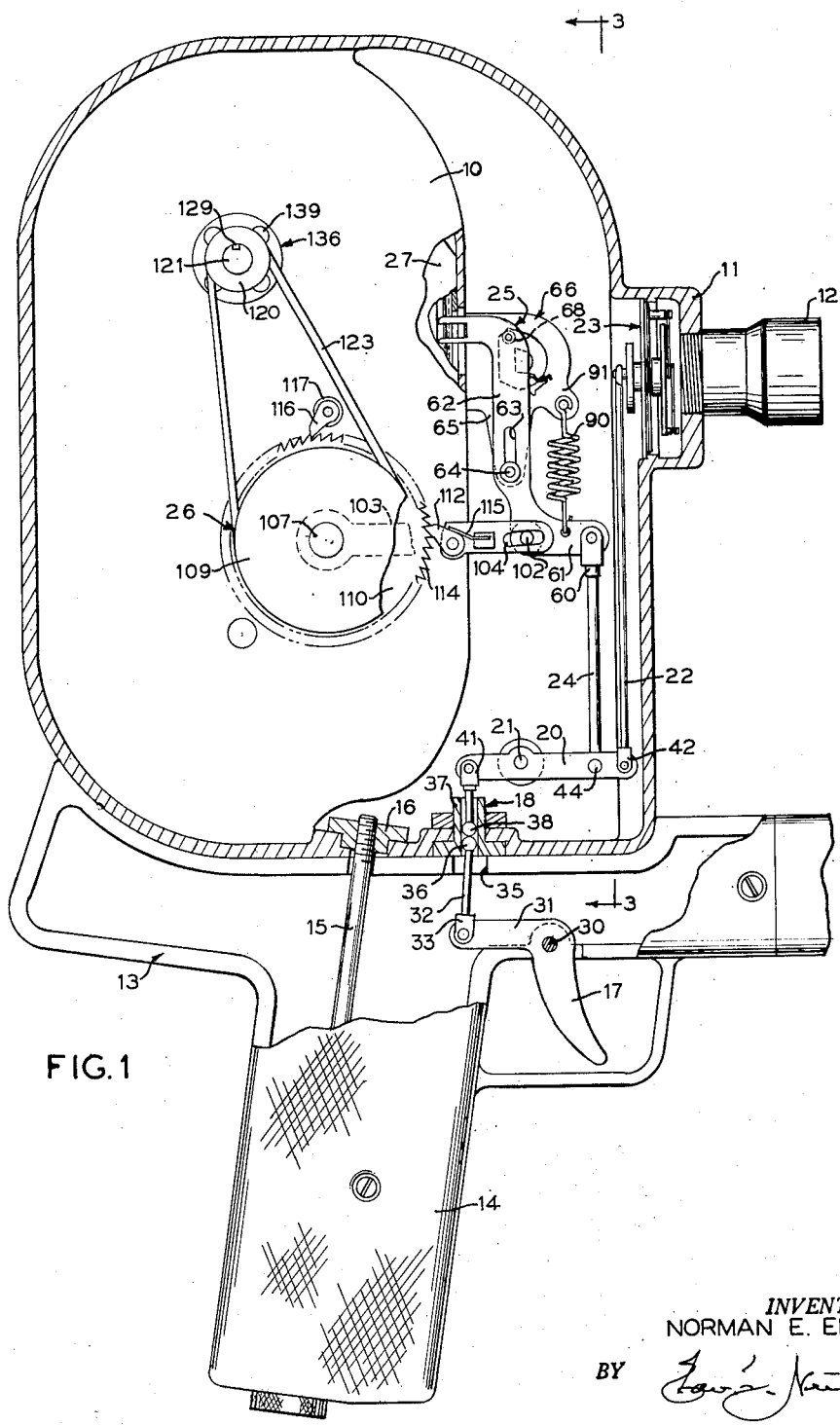
FIG. 1 is a side elevation, partly broken away, of one preferred form of the present invention showing the camera casing and base.

Referring now more particularly to one preferred form of the invention, FIGS. 1, 2 and 3 of the drawings show the camera as including a generally rectangular casing 8 having a removable cover 9 on one side thereof and a longitudinal inner wall 10. The forward portion of casing 8 is formed with a shutter housing 11 having a conventional lens assembly 12 secured thereto. Casing 8 is attached to a base 13 having a piston grip handle 14 by which the operator may manipulate the casing so as to aid positioning of the lens assembly with respect to a subject, such as a utility meter, in order to simplify focusing. It will be noted that with this arrangement, the camera casing is readily removable from its bed in base 13 by merely removing thumb screw 15 from its threaded socket 16, as would be necessary in order to load unexposed film into the camera with greater facility or to exchange a camera with exposed film for one with unexposed film. It will also be noted that the base may be provided with suitable means for illuminating the subject, such as a portable stroboscopic light (not shown) as is well known in the photographic art. The trigger 17 of handle 14 is connected through the quick-disconnect coupler 18 to one end of lever 20 which is pivoted on the casing at 21. The other end of lever 20 has pivotally secured thereto the rod 22 for operating shutter assembly 23 and the control rod 24 for actuating the film advancing mechanism 25. Film take-up mechanism, generally indicated at 26, is supported between the casing 8 and inner wall 10, being responsive to a predetermined movement of the film advancing mechanism for winding film on a take-up spool in the film magazine 27, which is fitted in the casing between inner wall 10 and removable cover 9.

Referring now particularly to the arrangement for coupling motion from trigger 17 to lever 20, it can be seen that the trigger 17 is conventionally pivoted at 30, with the result that its rearwardly extending arm 31 translates horizontal motion of the trigger to vertical motion of rod 32 which is pivoted thereto by clevis 33. Upward motion of rod 32 is transmitted to lever 20 through quick-disconnect coupler 18. For this purpose, rod 32 passes through hole 35 in base 13 and terminates in a ball 36 that is slidably received in an externally threaded coupling sleeve 37 which acts as a guide therefor. Companion ball 38 on the lower end of rod 40 is in abutting relation with the ball 36 in sleeve 37, with the upper end of rod 40 being pivotally attached to the short arm of lever 20 as by clevis 41. It will also be noted that this quick-disconnect arrangement allows a pendulum-like motion of rods 32 and 40 as trigger arm 31 pivots about pin 30 and lever 20 rotates about pivot 21. From this construction it can be seen that as rod 40 moves upwardly, it causes lever 20 to pivot in a clockwise direction. The longer arm of lever 20 terminates in an apertured end receiving clevis 42 to which is secured rod 22, the latter extending upwardly for actuation of shutter assembly 23 to be hereinafter described with respect to FIGS. 4 and 5. Lever 20 is apertured rearwardly of clevis 42 to receive the lower L-shaped end 44 of actuator rod 24, the upper end of which actuates film advancing mechanism 25 as will hereinafter be described in more detail.

Considering now the generally conventional shutter assembly 23, it can be seen that clockwise movement of lever 20 effects downward motion of rod 22 to cause rotation of shutter disk 47 about shaft 48, as best seen in FIGS. 4 and 5. Shaft 48 is rotatably mounted in shutter aperture plate 49 and passes therethrough to terminate in an enlarged portion having two opposed flats thereon, so as to be rigidly received within a corresponding aperture in one end of shutter arm 50 for fixed rotation therewith. As rod 22 moves downwardly, shutter arm 50 moves in a counterclockwise direction increasing the tension in spring 51 which is attached between arm 50 and shutter disk 53. As arm 50 continues its counterclockwise movement, spring 51 is in such a position as to rotate shutter disk 53 in a clockwise direction about pin 55 in a manner well known in the art. With the shutter disk 53 in motion, elongate aperture 56 in shutter disk 53 passes in front of aperture 58 and is momentarily aligned therewith so as to expose the film through the square aperture 59 in inner wall 10. After release of the trigger, the parts return to their original positions. It will be understood by those skilled in the art, of course, that the shutter mechanism would normally incorporate suitable electrical contacts for operation of a stroboscopic flash unit (not shown) which are eliminated here for simplicity.

Related to the above shutter action and synchronized therewith is the operation of the film advancing and take-up mechanisms. Considering first the film advancing arrangement of the present invention, it can be seen that rod 24 is secured by clevis 60 to the lower foot 61 of a generally Z-shaped film actuator 62. Actuator 62 is formed with a vertical slot 63 in the intermediate portion thereof to freely receive the stud 64 on the depending arm 65 of bracket 66, the latter being secured to the casing side wall. Bracket 66 is formed with a D-shaped slot or track 67 for guiding the roller-type cam follower 68 which is mounted on the upper end of film actuator 62. With counterclockwise movement of lever 20, rod 24 moves downwardly causing film actuator 62 to pivot clockwise about stud 64, thus removing film engaging tines 71 from the perforations (not shown) along the edge of the film 72, and cam follower 68 swings into the upper part of the curved portion of track 67.

To maintain positive engagement of the film at all times, a film keeper 75 is mounted within the light-proof film magazine 27. As best seen in FIG. 2, film keeper 75 is pivotally mounted to ear 74 on film gate 79 and is urged into elongate slot 78 thereof by spring 80. Tines 81 of film keeper 75 engage the film upon withdrawal of actuator tines 71 from the film, the arrangement being such that upon engagement of actuator 62 with the film, tines 71 thereof abut the body portion of the keeper so as to move tines 81 of the latter out of film engaging position. Further movement of lever 20 as induced by trigger 17 pulls film actuator 62 downwardly causing cam follower 68 to contact inclined surface 76, thus aiding cam follower 68 to trace the contour of the curved portion 77 of the D-track. In complementing the above action, slot 63 in the intermediate portion of film actuator 62 allows the actuator to move downwardly and pivot about its mounting stud 64.

Upon entering the bottommost portion 84 of the D-track, cam follower 68 encounters gate 85 which has a generally flat spring 86 adapted for resilient movement into a recess 87 upon passing of follower 68 thereover. Spring 86 is formed with a right angle bend 88 at one end rigidly fitted into a complementary slot in bracket 66 off of recess 87. The other end of spring 86 is returnbent so as to form a rounded surface over which cam follower 68 rides. This arrangement is such that the cam follower 68 will cam down spring 86 into recess 87 as it passes thereby into the portion 84 of the D-track. Thereafter, spring 86 returns to its original position precluding return movement of the follower. The relative adjustment of the shutter and film advancing mechanisms is such that at this point the shutter is tripped and an image is projected onto film 72 by lens 12. It will be observed that the shutter is operated after the cam follower 68 has passed gate 85 which prevents the cam follower from retracing its path into the curved portion of the D-track so as to preclude such double exposure as would result from the shutter operating two successive times without the film first being advanced.

After release of pressure on trigger 17 with film actuator 62 at the bottommost portion 84 of the D-track, the actuator returns to its original position under the influence of spring 90, the lower end of which is attached approximately midway along the foot 61 of film actuator 62. The upper end of spring 90 is attached to bracket 66 by means of ear 91 which is provided with a stud 92 having a cannelure at its outer end over which spring 90 is hooked. Spring 90 exerts a force which tends to raise film actuator 62 upwardly so as to bring cam follower 68 into contact with inclined surface 94 and at the same time impart a counterclockwise rotation to film actuator 62 which produces further inducement for it to rotate into the vertical portion 96 of D-track 67, thereby engaging tines 71 with the perforations (not shown) in film 72. As heretofore noted, such engagement causes abutment of tines 71 with keeper 75 so as to remove the keeper tines 81 out of engagement with the film. With tines 71 engaging film 72, spring 90 urges film actuator 62 upwardly along the straight portion 96 of track 67, carrying therewith the strip of film.

Upon nearing the completion of the upward movement of film actuator 62, cam follower 68 is brought into contact with inclined surface 97 and is cammed to a position more nearly over the apex 98 formed by the intersection of inclined surface 76 with surface 100 of straight portion 96 in D-track 67. This final action tends to preclude the cam follower from being pulled back into the straight portion 96 through which it has just passed. While this action will partially remove tines 71 from the perforations (not shown) in film 72, tines 71 remain in the film enough to prevent the accidental movement thereof, so as to maintain the desired even spacing between successive frames on the film.

Considering now the film take-up arrangement of my invention, at the lower end of the intermediate portion of actuator 62 is a drive pin 102 which couples movement to takeup mechanism 26. For this purpose, a ratchet arm 103 is formed at one end with an elongate slot 104 to be freely received on drive pin 102, being spaced outwardly from actuator 62 by collar 106. The other end of ratchet arm 103 is formed with an enlarged apertured head for pivotal mounting on shaft 107, the latter being fitted between casing 8 and inner wall 10. Rotatably supported on shaft 107 is the pulley 109 which has a ratchet wheel 110 secured to the side thereof, the arrangement being such that rotation of ratchet wheel 110 effects a like rotation of pulley 109. Ratchet arm 103 has pivotally secured at an intermediate position thereon a ratchet 112 which is urged into teeth 114 of ratchet wheel 110 by spring 115. From this arrangement it can be seen that upon the downward movement of film actuator 62, ratchet arm 103 pivots in a clockwise direction carrying with it ratchet 112 that slips over teeth 114 on ratchet wheel 110, accidental rotation of which is precluded by pawl 116 mounted to inner wall 10 on boss 117. With film actuator 62 in such a position as would place cam follower 68 adjacent the upper side of gate 85, further counterclockwise movement of drive pin 102 is permitted by the reception of the drive pin in the extreme forward end of slot 104.

Upon the upward movement of film actuator 62, drive pin 102 causes ratchet arm 103 to pivot in a counterclockwise direction engaging ratchet 112 in teeth 114 of ratchet wheel 110 and imparting a counterclockwise motion thereto. Pulley 109, through belt 123, rotates a substantially smaller pulley 120 which is rotatably mounted on slotted shaft 121, as best seen in FIG. 7.

Face 124 of pulley 130 acts as a drive plate for friction disk 125 which acts against clutch plate 126. Clutch plate 126 is formed with an internal spline 128 which is recived in groove 129 in shaft 121 in such a manner as to be free for axial movement but fixed for rotational movement with shaft 121. Spring washer 130 acts against clutch plate 126 to maintain pressure between pulley 122, friction disk 125 and clutch plate 126. Spring washer reacts against thrust bearing race plate 131 which is grooved on one face, as at 133, to receive a plurality of ball bearings indicated generally by numeral 134. On face 135 of mounting flange 136 there is a groove 137, corresponding to groove 133, which acts as the second race for the bearings 134. Mounting flange 136 is formed with a boss 138 which protrudes through an aperture in inner wall 10 and is fastened thereto by a plurality of rivets or screws as at 139. Shaft 121 passes through a central bore 140 in flange 136 which is provided with a shallow counterbore 141 in which there is provided the ball bearings. This arrangement is such that shoulder 143 on shaft 121 causes washer 144 to abut bearings 142 in order to provide a thrust bearing as well as a radial load bearing for shaft 121. Formed on the outer end of shaft 121 is a standard mounting spindle 145 which fits through magazine 27 and into a conventional film spool 146 acting as a take-up spool for exposed film, as seen best in FIG. 2. Mounted below spool 146 in magazine 27 is a similar spool 147 which supplies unexposed film to the camera around guide roller 149, through spring loaded film gate 79 over guide roller 151 and onto take-up spool 146.

It will be noted that rotation of pulley 109 will cause a subsequent greater rotation of pulley 120 which induces a rotation, through the clutch assembly, to shaft 121 in order to wind the exposed film onto spool 146. This arrangement is necessary because varying amounts of film on take-up spool 146 necessitate varying degrees of rotation of the take-up spool in order to wind the same amount of film each time a picture is taken whether the take-up spool is empty or full of film. While pulley 109 and pulley 120 rotate through constant angles at all times, film spool 146 must rotate through a constantly varying angle, as permitted by the clutch assembly.

It will be noted that according to the preferred embodiment of the invention, film spools 146 and 147 are in a magazine so as to facilitate loading and unloading of the camera. By using a magazine it is possible to change film under normal lighting conditions without the risk of destroying the latent image on the exposed film or ruining the unexposed film by exposure to light. It will, of course, be recognized by those skilled in the art that while it is advantageous to use a magazine, this is not absolutely necessary. If desired, the camera could be so constructed as to accept the reels 146 and 147 without the magazine by having the film backing plate and keeper mechanism fixed to the casing 8; however, the magazine system is preferred due to absence of risk involved in handling the film. It will also be noted that the camera may be provided with a conventional film counter for determining the number of exposures taken or the total length of film which has been used.

From the foregoing it will be apparent that I have provided a new and improved camera which is well adapted to fulfill the aforestated objects. Moreover, while the invention has been described with respect to a particular embodiment of the invention, it will be apparent to those skilled in the art to which the invention most nearly appertains that other embodiments or modifications thereof may be resorted to without departing from the spirit or scope of the invention as defined by the appended

I claim:

1. In a camera having a casing with a shutter mechanism and film take-up mechanism, a bracket secured to said casing, said bracket defining a D-shaped slot, a film actuator, a cam follower on said actuator adapted to ride in said D-shaped slot so as to guide the motion of said actuator, a lever pivoted to said casing, selectively operable means connected to said lever for pivoting said lever, means responsive to movement of said lever for actuating said shutter mechanism, means also responsive to movement of said lever for moving said film actuator, and means responsive to a predetermined movement of said film actuator for operating said film take-up mechanism.

2. In a film handling device for advancing a strip of film, a casing, a bracket secured to said casing, said bracket defining a D-shaped track, a film actuator, a cam follower on said actuator adapted to ride in said D-shaped slot so as to guide the motion of said actuator, said film actuator having tines for engaging perforations in a strip of film, said D-shaped slot having a straight portion and a curved portion, said tines being in film engaging position when said follower is in the straight portion of said slot, said tines being out of film engaging position when said follower is in the curved portion of said slot.

3. In a camera; a Z-shaped actuator having a vertical body portion provided with a vertical slot and having a rearwardly extending upper arm, the latter being provided with film engaging tines; a fixed cam member having a mounting pin fast thereon and in the slot so that the actuator may move generally vertically, the member being provided with a D-shaped slot the straight part of which is vertical; a follower on the actuator and in the D-shaped slot to limit motion of the actuator to a motion for disengagement of the tines with the film at the upper portion of the D-shaped slot, engagement of the film at the lower portion of the D-shaped slot, and advancing the film by returning to starting position; a spring acting on the lower arm tending to rotate the actuator about the pin and move the tines forwardly into engagement with film; and selectively operable means for moving the actuator downwardly.

4. In a camera; a Z-shaped actuator having a vertical body portion provided with a vertical slot and having a rearwardly extending upper arm, the latter being provided with film engaging tines; a fixed cam member having a mounting pin fast thereon and in the slot so that the actuator may move generally vertically, the member being provided with a D-shaped slot the straight part of which is vertical; a follower on the actuator and in the D-shaped slot to limit motion of the actuator to a motion for disengagement of the tines with the film at the upper portion of the D-shaped slot, engagement of the film at the lower portion of the D-shaped slot, and advancing the film by returning to starting position; a spring acting on the lower arm tending to rotate the actuator about the pin and move the tines forwardly into engagement with film; selectively operable means for moving the actuator downwardly; and a spring gate in the bottom portion of said D-shaped slot to preclude retracing of the D-shaped slot by the follower.

5. In a camera; a shutter assembly having a shutter to be cocked; a Z-shaped actuator having a vertical body portion provided with a vertical slot and having a rearwardly extending upper arm, the latter being provided with film engaging tines; a fixed cam member having a mounting pin fast thereon and in the slot so that the actuator may move generally vertically, the member being provided with a D-shaped slot the straight part of which is vertical; a follower on the actuator and in the D-shaped slot to limit motion of the actuator to a motion for disengagement of the tines with the film at the upper portion of the D-shaped slot, movement through the curved portion of said D-shaped slot engagement of the film at the lower portion of the D-shaped slot, and advancing the film by returning to starting position; a spring acting on the lower arm tending to rotate the actuator about the pin and move the tines forwardly into engagement with film; and selectively operable means for moving the actuator downwardly, and means for cocking said shutter during movement of the follower through the curved portion of said D-shaped slot.

6. In a camera; a substantially reciprocatory film actuator; a take-up spool shaft and a driven shaft and a friction coupler connecting said shafts but permitting slippage at the coupler; a third shaft parallel with the driven shaft; means connecting the third and the driven shafts and for increasing the speed of the driven shaft relative to that of the third shaft; a ratchet wheel fast on the third shaft and a ratchet lever mounted for turning on the third shaft, the lever having a longitudinal slot therein, a pivot pin in the slot and secured to the actuator, whereby said third shaft turns in response to movement of said actuator in one direction, and means for preventing rotation of the third shaft when the actuator moves in the other direction.

References Cited in the file of this patent

UNITED STATES PATENTS

| | | |
|---|---|---|
| 675,781 | MacDonald | June 4, 1901 |
| 1,560,908 | Garbutt | Nov. 10, 1925 |
| 1,824,709 | Debrie | Sept. 22, 1931 |
| 1,864,768 | Seeling | June 28, 1932 |
| 1,865,272 | Owens | June 28, 1932 |
| 1,954,885 | Mitchell | Apr. 17, 1934 |
| 1,955,300 | Kurnick | Apr. 17, 1934 |
| 2,044,434 | Kilfitt | June 16, 1936 |
| 2,426,947 | Potts | Sept. 2, 1947 |
| 2,464,673 | Debrie | Mar. 15, 1949 |
| 2,522,214 | Dreisbach | Sept. 12, 1950 |
| 2,733,021 | Foster et al. | Jan. 31, 1956 |
| 2,791,164 | Faulhaber | May 7, 1957 |
| 2,793,573 | Cuchet | May 28, 1957 |
| 2,908,208 | Michatek et al. | Oct. 13, 1959 |
| 2,928,315 | Broido | Mar. 15, 1960 |
| 2,931,283 | Schreiber | Apr. 5, 1960 |